United States Patent [19]

Toti et al.

[11] Patent Number: 4,606,551
[45] Date of Patent: Aug. 19, 1986

[54] OSCILLATION-DAMPING DEVICE FOR A MOTOR VEHICLE

[75] Inventors: Gabriele Toti; Franco Marinoni, both of Milan; Pasquale Amato, Gallarate; Claudio Nenna, Arese, all of Italy

[73] Assignee: Alfa Romeo Auto S.p.A., Naples, Italy

[21] Appl. No.: 591,549

[22] Filed: Mar. 20, 1984

[30] Foreign Application Priority Data

Aug. 4, 1983 [IT] Italy ............................. 22433 A/83

[51] Int. Cl.⁴ .............................................. B62D 9/02
[52] U.S. Cl. ................................... 280/772; 280/6.11
[58] Field of Search ................. 280/6 R, 6.11, 689, 280/772

[56] References Cited

U.S. PATENT DOCUMENTS 4,397,477 8/1983 Harrison ........................... 280/6 R

FOREIGN PATENT DOCUMENTS 148606 11/1980 Japan ................................. 280/689
1245805 9/1971 United Kingdom ............... 280/6.11

Primary Examiner—John J. Love
Assistant Examiner—Ross Weaver
Attorney, Agent, or Firm—Charles E. Brown; Charles A. Brown

[57] ABSTRACT

The invention relates to an oscillation-damping device for a motor vehicle; the device is constituted by cylinders and pistons, of which the upper and lower variable volume chambers are filled with a fluid and are interconnected by means of a system of conduits provided with damping constrictions having a cross-section which varies with the fluid passage velocity, some being capable of a symmetrical damping action in the two flow directions, while others are capable of a differential damping action in the two flow directions.

3 Claims, 3 Drawing Figures

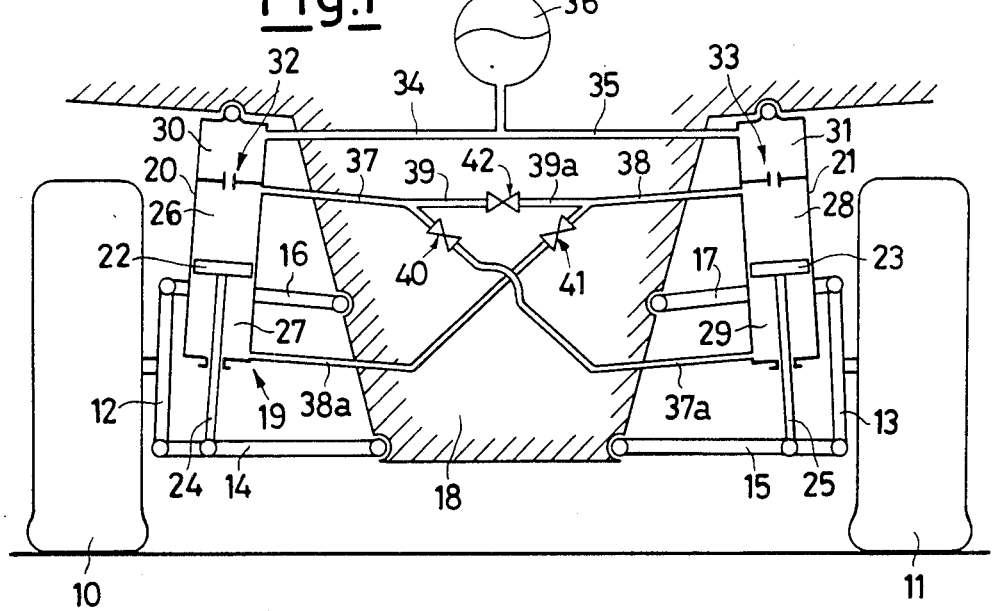
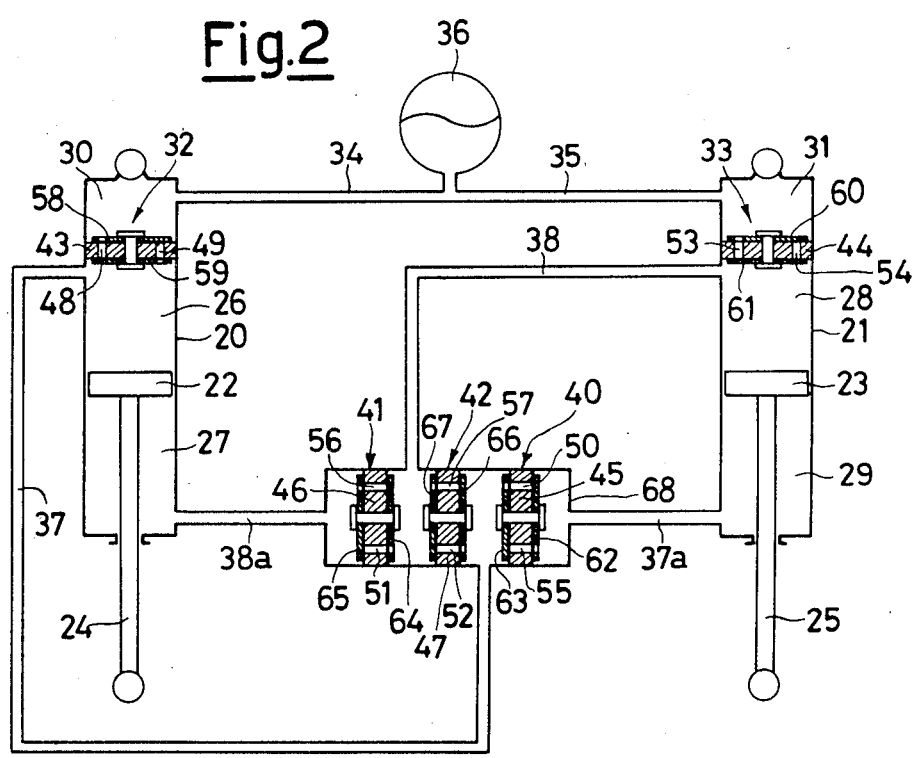

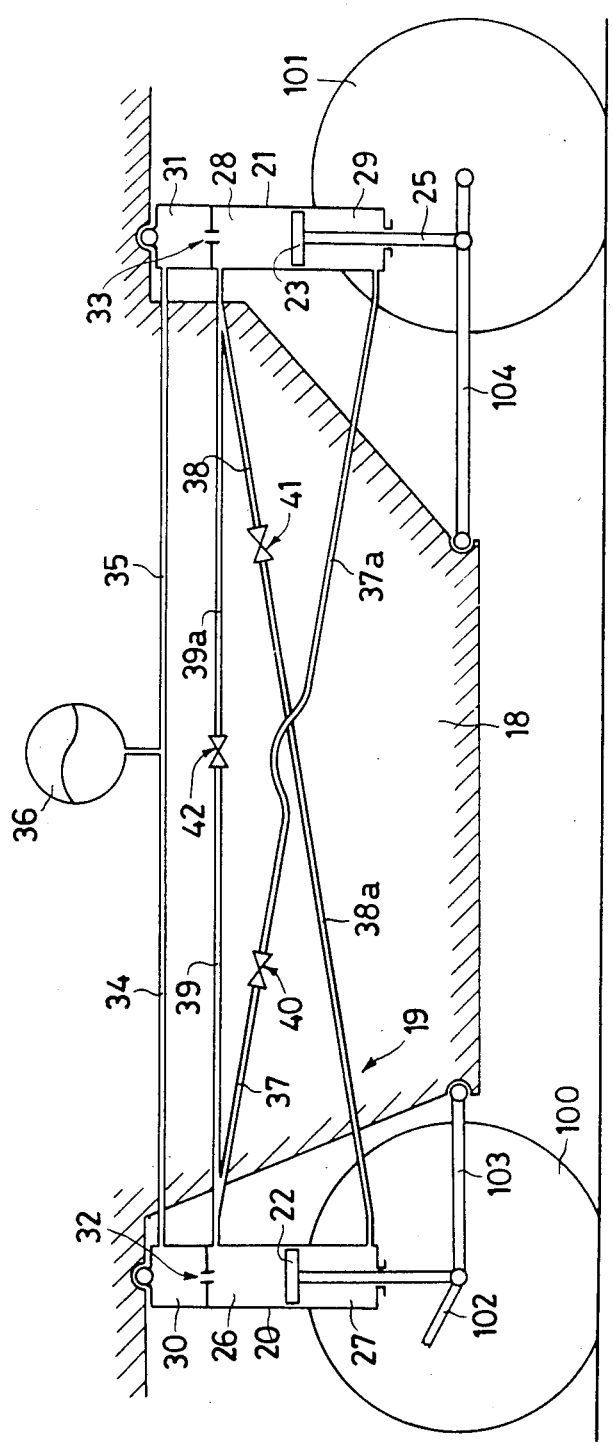

OSCILLATION-DAMPING DEVICE FOR A MOTOR VEHICLE

The present invention relates to a motor vehicle damping device which is capable of minimising the oscillations deriving from the relative rotary and vertical translatory movements which occur between the body and wheels, as the result of manoeuvring or road conditions. Braking and acceleration give rise to a mainly pitching rotary motion; entering and leaving a bend gives rise to mainly rolling rotary motion; ground irregularities give rise to a composite translatory and rotary movement.

In motor vehicles, oscillation damping is generally effected by telescopic hydraulic shock absorbers, the purpose of which is to minimise the relative movements between the body and wheels due to ground irregularities, or to braking, accelerating or traversing bends.

However, their effectiveness is limited by the fact that their setting has to be a compromise between the requirements of the different situations, and where the setting favours certain operating conditions it also penalises others.

For example, if the shock absorber setting is such as to optimise comfort and adherence when ground irregularities are present, it can also partially dampen pitching movements, whereas it can be inadequate for nullifying rolling movements.

In order to overcome the limitations of conventional designs, our research was directed towards a damping device which would allows specific and largely independent settings to be made for the two types of movement, namely rotary and vertical translatory. This was achieved by a damping device in which the individual groups of sized orifices operate in accordance with prearranged schemes in relation to the type of relative movement between the body and wheels, so that the device operates in an optimum manner under the various operating conditions.

The damping device according to the invention comprises at least one pair of cylinders and double acting pistons which are slidable in a sealed manner in the respective cylinders, wherein the cylinders and pistons, which are connected to the motor vehicle body and to a pair of wheels thereof, define lower and upper variable volume chambers filled with fluid, the device being characterised in that the variable volume chambers of said pair of cylinders are interconnected by at least two conduits, each of which connects the upper chamber of one cylinder to the lower chamber of the other cylinder, said two conduits being in their turn connected together by damping constrictions which are of variable cross-section in order to vary the resistance to the passage of the fluid as the velocity of said fluid varies, and which are capable of a symmetrical damping action in the two flow directions.

By suitably dimensioning said constrictions it is possible to choose the degree of damping which is considered most favourable for minimising the oscillations of the relative rotary movements between the body and wheels.

An arrangement of this kind gives practically no damping of vertical translatory movements, and thus in an alternative embodiment the damping device is also active for translatory movements and movements which have translatory components.

In this case the damping device is characterised in that each of said two conduits is provided with respective damping constrictions which are of variable cross-section in order to vary the resistance to the passage of the fluid as the velocity of said fluid varies, and are capable of a differential damping action in the two flow directions.

Characteristics and advantages of the invention are described hereinafter with reference to the accompanying FIGS. 1 to 3, which show preferred embodiments of the invention by way of non-limiting example.

FIG. 1 is a diagrammatic front view of a motor vehicle in which the front wheel set is provided with the damping device according to the invention;

FIG. 2 is a more detailed representation of the damping device of FIG. 1;

FIG. 3 is a side view of a motor vehicle in which each pair of right hand and left hand wheels is provided with the damping device according to the invention.

In FIG. 1 the reference numerals 10 and 11 indicate the front wheel set of a motor vehicle; the reference numerals 12 and 13 indicate their steering knuckles, and 14, 15, 16 and 17 the lower and upper suspension arms which are pivoted to the motor vehicle body, indicated by 18.

The normal resilient suspension elements, springs and antiroll bar are not shown for clarity.

Between the suspension arms of the wheels 14, 15 and the motor vehicle body 18 there is interposed a damping device indicated overall by 19. The device comprises two oil-filled cylinders 20 and 21 connected to the body 18, and two double acting pistons 22 and 23 which are slidable in a sealed manner in respective cylinders, and are connected by means of their rods 24 and 25 to the suspension arms 14 and 15. The cylinders 20 and 21 are shown transparent for clarity.

The reference numerals 26 and 27 indicate the upper and lower variable volume chambers of the cylinder 20, and the reference numerals 28 and 29 indicate those of the cylinder 21. The reference numerals 30 and 31 indicate the compensation chambers for the volume of the rods 24 and 25, which are provided for each cylinder 20 and 21. The compensation chambers 30 and 31 are connected to the chambers 26 and 28 by way of constrictions indicated overall by 32 and 33, which schematically represent the members formed by the plugs 43 and 44 provided with respective groups of sized damping orifices 48, 49 and 53, 54, and the relative lamina valves 58, 59 and 60, 61, which are shown in greater detail in FIG. 2.

The compensation chambers 30 and 31 are also connected by the conduits 34 and 35 to a hydraulic-pneumatic accumulator 36 which is provided in order to maintain the oil circuits slightly under pressure and to prevent cavitation.

The upper chamber 26 of the cylinder 20 is connected by means of the conduits 37 and 37a to the lower chamber 29 of the cylinder 21. The upper chamber 28 of the cylinder 21 is connected by means of the conduits 38 and 38a to the lower chamber 27 of the cylinder 20. The two conduits 37 and 38 are interconnected by means of the conduits 39 and 39a.

A damping constriction indicated overall by 40 is disposed between the conduits 37 and 37a, a damping constriction indicated by 41 is disposed between the conduits 38 and 38a, and a damping constriction indicated by 42 is disposed between the conduits 39 and 39a. The constrictions 40, 41, 42 schematically represent the members comprising the groups of sized damping orifices and relative lamina valves, which are of the same form as those of the known art used in common telescopic shock absorbers, as shown in FIG. 2. The members 40, 41, 42 are each formed from a plug 45, 46, 47 provided with a first set of through sized orifices indicated by 50, 51, 52 and a second set of through sized orifices, indicated by 55, 56, 57.

Each plug is provided with a pair of valves formed from elastically deformable disc laminas 62 and 63, 64 and 65, 66 and 67. Each lamina is provided with a set of through holes which, as is normal, are aligned with the sized orifices of the respective plug, the passage cross-sections of which are regulated by the valve formed by the other lamina. The plugs 45, 46, 47 are disposed in the cavity 68 of a casing 69 into which the conduits 37, 37a, 38, 38a open. The conduits 39 and 39a with the damping constriction 42 could alternatively connect together the conduits 38a and 37a, and the constrictions 40 and 41 could be disposed in the conduits 37 and 38, upstream of the branch points of the conduits 39 and 39a. The said sized orifices and the respective lamina valves thus constitute the damping constrictions, which are of variable cross-section in order to vary the resistance to the passage of the oil as the velocity of said oil varies.

The orifices and valves of the plugs 45, 46 are sized in order to perform a differential damping action in the two flow directions corresponding to the compression and extension of the damping device. Consequently, the dimensions of the orifices of one set and of the relative valve are different from the dimensions of the orifices of the other set and of the relative valve. In contrast, the orifices and valves of the plug 47 are sized for providing a symmetrical damping action in the two flow directions, and consequently identical dimensions are used for the sized orifices of the two sets and of the relative valves.

When relative vertical translatory movements occur between the body 18 and wheels 10 and 11, the oscillations are damped by the constrictions 40 and 41. The constriction 42 is inactive and provides no contribution, whatever its sizing. However, in the case of relative rotary movements, the oscillations are damped by the constrictions 40, 41, 42, and all three constrictions 40, 41, 42 also act in the case of composite translatory and rotary movements.

The oscillation damping for rotary movements depends not only on the sizing of the constrictions 40 and 41, but also on the sizing of the constriction 42, and is greater the smaller the passage cross-section of the constriction 42 (orifices 52 and 57 and lamina valves 66 and 67 of the plug 47).

In contrast, if the passage cross-sections of the conduits 39 and 39a were free and the constriction 42 was missing, then the oscillation damping for rotary movements would be of an extent equal to that obtainable with normal telescopic shock absorbers having the same constriction sizing as the constrictions 40 and 41.

Thus by varying the constriction 42 it is possible to vary the damping effect of the device for rotary movements while maintaining the damping effect for vertical translatory movements unchanged. For example, during vehicle braking, the body 18 is subjected to pitching motion with vertical translatory oscillations with respect to the wheel pairs of the front and rear sets. When the cylinders 20 and 21 move downwards relative to the pistons 22 and 23, the volume of the chambers 26 and 28 reduces, whereas the volume of the chambers 27 and 29 increases. When the cylinders 20 and 21 move upwards relative to the pistons 22 and 23, the volume of the chambers 26 and 28 increases whereas the volume of the chambers 27 and 29 decreases.

The oil which is compressed in the chamber 26 is forced to flow towards the chamber 29 by seeping through the sized orifices 50 of the plug 45 (FIG. 2), because the lamina valve 62 rises under the action of the pressure difference across its faces.

Part of the oil contained in the chamber 26 flows to the compensation chamber 30 through the orifices 49, due to the rising of the lamina valve 58. The quantity of oil reaching the chamber 30 corresponds to the volume occupied by the rod 25 in the chamber 29. Simultaneously, the oil compressed in the chamber 28 is forced to flow to the chamber 27 by seeping through the sized orifices 51 of the plug 46, because the lamina valve 65 rises under the action of the pressure difference across its faces.

Part of the oil contained in the chamber 28 flows to the compensation chamber 31 through the orifices 54 due to the raising of the lamina valve 60. Again in this case the quantity of oil reaching the chamber 31 corresponds to the volume occupied by the rod 24 in the chamber 27.

When compression of the damping device 19 ceases and is followed by extension, the oil flows back in the reverse direction from the chambers 29 and 30 to the chamber 26 by seeping through the sized orifices 55 of the plug 45 and through the sized orifices 48 of the plug 43, and flows back from the chambers 27 and 31 to the chamber 28 by seeping through the sized orifices 56 of the plug 46 and through the sized orifices 53 of the plug 44.

Thus in damping translatory oscillations, only the sized orifices and relative valves of the plugs 45 and 46 act, to perform a differential damping action in the two flow directions. In contrast, the sized orifices of the plug 47 remain inactive because oil does not flow through them as the pressure acting on the faces of the laminas 66 and 67 are identical.

When the vehicle traverses a bend, for example a left hand bend, the centrifugal force subjects the body 18 to rolling with rotary oscillations with respect to the wheel pairs of the front and rear sets.

When the cylinder 21 moves downwards relative to the piston 23, the cylinder 20 rises relative to the piston 22, and the chambers 27 and 28 reduce in volume whereas the chambers 26 and 29 increase in volume.

The oil compressed in the chamber 28 is forced to flow to the chamber 26 by seeping through the sized orifices 57 of the plug 47, due to the raising of the lamina valve 66 under the action of the pressure difference across its faces.

Simultaneously, the oil compressed in the chamber 27 is forced to flow to the chamber 29 by seeping through the sized orifices 56 of the plug 46, through the sized orifices 57 of the plug 47, and through the sized orifices 50 of the plug 45, due to the raising of the lamina valves 64, 66 and 62 under the action of the pressure difference across their faces.

In the case of a reverse rotary movement of the body 18 with respect to the wheels 10 and 11, the cylinder 21 rises with respect to the piston 23 and the cylinder 20 moves downwards with respect to the piston 22. In this case, the oil seeps through the sized orifices 55, 52, 51 of said plugs 45, 47, 46.

Thus in damping rotary oscillations, the sized orifices and relative valves of all three plugs 45, 46, 47 act, but the damping effect on the rotary movements depends essentially on the sizing of the orifices and valves of the plug 47, which produce a damping effect which is greater the smaller the passage cross-sections, and perform a symmetrical damping action in the two flow directions. Oscillation damping for the body 18 where only one wheel encounters a ground irregularity is due to a combination of the actions described heretofore, because the body movements can be considered as a combination of rotary and vertical translatory movements. FIG. 3 shows a motor vehicle body 18, a right hand front wheel 100 and a right hand rear wheel 101. The reference numerals 102 and 103 indicate the front wheel suspension arms and 104 indicates a rear wheel suspension arm. Between the wheel suspension arms and the vehicle body there is interposed a damping device formed in the same manner as that shown in FIG. 1, and consequently like elements are indicated by the same numerals.

Again in this case, when a translatory relative movement occurs between the body and wheels, oscillation damping is effected by the constrictions 40 and 41. When a rotary relative movement occurs, oscillation damping is effected by the constrictions 40, 41 and 42, and all three constrictions 40, 41, 42 also act in the case of a composite translatory and rotary movement.

In this case the constrictions 40, 41, 42 again schematically represent the members comprising the groups of sized orifices and relative lamina valves, of which one embodiment is shown in FIG. 2.

In this case the relative movements between the body and wheels have reference to the wheel pairs disposed on the same side of the vehicle, and are therefore of rotary type in the case of pitching, whereas they are of vertical translatory type in the case of rolling, and of composite translatory and rotary type where ground irregularities are present.

In an alternative embodiment, the device shown in FIG. 1 could be used on a motor vehicle combined with that shown in FIG. 3, in order to solve oscillation damping problems in the case of rolling and pitching motion.

In the illustrated embodiments, the damping constrictions are formed with cross-sections which vary passively; alternatively, they could be controlled actively as a function of significant vehicle running parameters.

We claim:

1. A damping device for a motor vehicle constituted by a body, wheels, suspensions and resilient means interposed between the body and wheels, said device comprising at least one pair of cylinders and double acting pistons which are slidable in a sealed manner in the respective cylinders, wherein the cylinders and pistons, which are connected to the body and to a pair of wheels, define lower and upper variable volume chambers filled with fluid, said device being characterised in that the variable volume chambers of said pair of cylinders are interconnected by at least two conduits, each of which connects the upper chamber of one cylinder to the lower chamber of the other cylinder, said two conduits being in their turn connected together by groups of normally closed damping constrictions which are of variable cross-section in order to vary the resistance to the passage of the fluid as the velocity of said fluid varies, and which are capable of a symmetrical damping action in the two flow directions.

2. A damping device for a motor vehicle constituted by a body, wheels, suspensions and resilient means interposed between the body and wheels, said device comprising at least one pair of cylinders and double acting pistons which are slidable in a sealed manner in the respective cylinders, wherein the cylinders and pistons, which are connected to the body and to a pair of wheels, define lower and upper variable volume chambers filled with fluid, said device being characterised in that the variable volume chambers of said pair of cylinders are interconnected by at least two conduits, each of which connects the upper chamber of one cylinder to the lower chamber of the other cylinder, said two conduits being in their turn connected together by groups of damping constrictions which are of variable cross-section in order to vary the resistance to the passage of the fluid as the velocity of said fluid varies, and which are capable of a symmetrical damping action in the two flow directions, each of said two conduits being provided with respective groups of damping constrictions which are of variable cross-section in order to vary the resistance to the passage of the fluid as the velocity of said fluid varies, and which are capable of a differential damping action in the two flow directions.

3. A damping device for a motor vehicle constituted by a body, wheels, suspensions and resilient means interposed between the body and wheels, said device comprising at least one pair of cylinders and double acting pistons which are slidable in a sealed manner in the respective cylinders, wherein the cylinders and pistons, which are connected to the body and to a pair of wheels, define lower and upper variable volume chambers filled with fluid, said device being characterised in that the variable volume chambers of said pair of cylinders are interconnected by at least two conduits, each of which connects the upper chamber of one cylinder to the lower chamber of the other cylinder, said two conduits being in their turn connected together by groups of damping constrictions which are of variable cross-section in order to vary the resistance to the passage of the fluid as the velocity of said fluid varies, and which are capable of a symmetrical damping action in the two flow directions, the conduits which branch from the upper and lower cavities of said cylinders opening into the cavity of a casing which houses three plugs, each of said plugs being provided with two sets of through sized orifices and with two relative valves formed from elastically deformable laminas which selectively shut-off the two sets of sized orifices, the conduits connected to the upper chambers of the cylinders and the conduits connected to the lower chambers of said cylinders opening at the opposing faces of two plugs, of which the sized orifices of one set and its relative valve are of a different size than the sized orifices of the other set and its relative valve, the conduits connected to the upper chambers of said cylinders opening in their turn at the opposing faces of the third plug, of which the sized orifices of the two sets and their relative valves are of the same size.

* * * * *